(12) United States Patent
Guo et al.

(10) Patent No.: US 10,942,025 B2
(45) Date of Patent: Mar. 9, 2021

(54) MEASUREMENT METHOD FOR MICRO TOPOGRAPHY AND ROUGHNESS OF INTERNAL SURFACE OF GAP

(71) Applicant: DALIAN UNIVERSITY OF TECHNOLOGY, Dalian (CN)

(72) Inventors: Jiang Guo, Dalian (CN); Shujie Liu, Dalian (CN); Renke Kang, Dalian (CN); Dongming Guo, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/636,491

(22) PCT Filed: Jun. 27, 2018

(86) PCT No.: PCT/CN2018/093078
§ 371 (c)(1),
(2) Date: Feb. 4, 2020

(87) PCT Pub. No.: WO2020/000249
PCT Pub. Date: Jan. 2, 2020

(65) Prior Publication Data
US 2020/0249015 A1    Aug. 6, 2020

(51) Int. Cl.
*G01B 15/08* (2006.01)
*G01B 11/30* (2006.01)
*G01B 21/30* (2006.01)

(52) U.S. Cl.
CPC .............. *G01B 15/08* (2013.01); *G01B 11/30* (2013.01); *G01B 21/30* (2013.01)

(58) Field of Classification Search
CPC .......... G01B 15/08; G01B 21/30; G01B 5/20; G01B 5/28; G01B 11/30
See application file for complete search history.

(56) References Cited

U.S. PATENT DOCUMENTS

2013/0108118 A1*    5/2013  Hinaga ................ G01B 11/303
382/108

FOREIGN PATENT DOCUMENTS

CN    202472116 U    10/2012
CN    103363946 A    10/2013
(Continued)

OTHER PUBLICATIONS

Li, Ruijun et al. "Fabrication and Study of Micro Monolithic Tungsten Ball Tips for Micro/Nano-CMM Probes"; Micromachines 2018, vol. 9, 133, Mar. 19, 2018; pp. 1-9, <https://doi.org/10.3390/mi903013>.

*Primary Examiner* — David E Smith
*Assistant Examiner* — Hsien C Tsai
(74) *Attorney, Agent, or Firm* — Muncy, Geissler, Olds & Lowe, P.C.

(57) ABSTRACT

A measurement method for micro topography and roughness of internal surface of gap belongs to the technical field of precision measurement and is realized based on a measurement system which comprises a PC, a controller, a flexible mechanism and a measurement thin film. The measurement thin film has a copy function and is bonded to the flexible mechanism. The PC is connected with the flexible mechanism through the controller to control the flexible mechanism to expand or contract. The measurement method can effectively solve the measurement problem of the micro topography and surface roughness of the internal surface of the gap with a narrow inlet size. The method is simple and easy to operate, and the device is easy to carry, low in cost and high in measurement accuracy.

8 Claims, 1 Drawing Sheet

(56) References Cited

FOREIGN PATENT DOCUMENTS

| | | | |
|---|---|---|---|
| CN | 103615992 | A | 3/2014 |
| CN | 105021417 | A | 11/2015 |
| CN | 107416763 | A | 12/2017 |
| CN | 207074048 | * | 3/2018 |
| CN | 207074048 | U | 3/2018 |
| JP | 2003-226546 | A | 8/2003 |

* cited by examiner

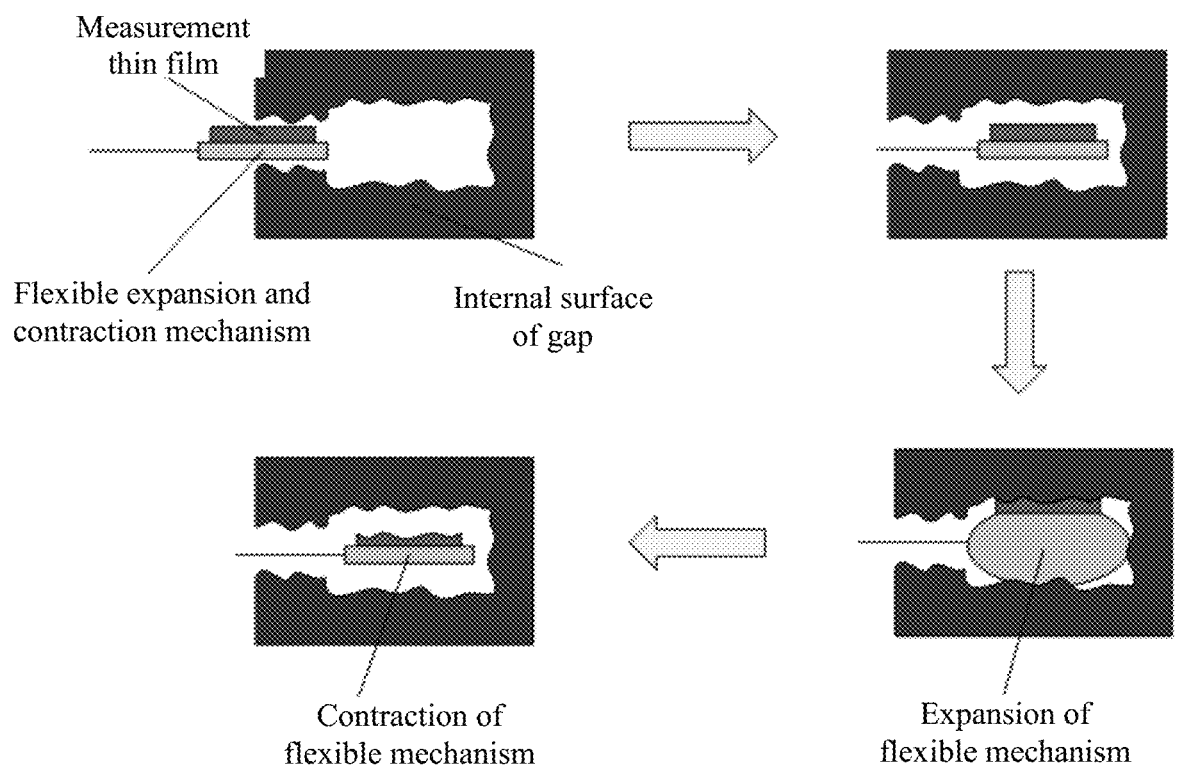

MEASUREMENT METHOD FOR MICRO TOPOGRAPHY AND ROUGHNESS OF INTERNAL SURFACE OF GAP

TECHNICAL FIELD

The present invention belongs to the technical field of precision measurement, and relates to a measurement method for micro topography and surface roughness of an internal surface of a gap.

BACKGROUND

With the continuous progress of manufacturing technologies, precision machining technology or hybrid manufacturing technology combined with 3D printing can be used to process components with very complex structures. However, because the complex structures increase measurement difficulty, there is a new challenge especially for measurement of the gap with a narrow size at the inlet.

At present, there are mainly a probe method, a capacitance method, an eddy current method and an optical fiber method to measure the geometrical size of the gap. In addition, a digital X-ray imaging method (patent no. CN105021417A) and a probe with the size of dozens of microns (Micromachines 2018, 9(3), 133; https://doi.org/10.3390/mi9030133) can also be used for measurement. Although these measurement methods can obtain the geometrical size information of the gap, it is difficult to measure the information about micro topography and surface roughness of the internal surface deep in the gap.

At present, the information about micro topography and surface roughness of the internal surface can be obtained to a certain degree by using optical means, endoscopic system (CN202472116U) or diffuse reflection flux measurement (CN103615992A). However, the endoscopic system is unable to enter the deep place of the gap with a narrow inlet size, and it is difficult to measure the diffuse reflection light.

Due to the great difficulty in both contact measurement and non-contact measurement, there is no measurement method for effective measurement of micro topography and roughness of the internal surface deep in the gap.

SUMMARY

To solve the measurement problem of micro topography and surface roughness of the internal surface of the gap with a narrow inlet, the present invention provides a new measurement method for micro topography and roughness of an internal surface of a gap. A flexible measurement mechanism with a measurement thin film is used. The flexible measurement mechanism has expansion and contraction functions at a place to be measured on the internal surface of the gap, and carries the measurement thin film to enter the gap and measure micro topography and surface roughness of the internal surface. Namely, the measurement method measures micro topography and surface roughness of the internal surface of the gap in combination with the flexible mechanism and the measurement thin film, wherein the measurement thin film extracts information about the micro topography and surface roughness of the internal surface through a copy manner.

To achieve the above purpose, the present invention adopts the following technical solution:

A measurement method for micro topography and surface roughness of an internal surface of a gap is realized based on a measurement system which comprises a PC, a controller, a flexible mechanism and a measurement thin film. The measurement thin film is bonded to the flexible mechanism and has a copy function. The PC is connected with the flexible mechanism through the controller to operate the flexible mechanism. The PC is used for setting information such as expansion and contraction sizes of the flexible mechanism or internal pressure of the flexible mechanism after inflation and deflation of the flexible mechanism; and the controller is used for driving the flexible mechanism to expand or contract. The PC is connected with the flexible mechanism through the controller to operate the flexible mechanism specifically: the PC is used for setting the expansion and contraction sizes of the flexible mechanism and pressure information of the internal surface of the gap from the flexible mechanism after expansion of the flexible mechanism; and the controller is used for driving the flexible mechanism to expand or contract in the form of voltage loading.

The flexible mechanism is made of shape memory alloy or a small air bag; and the size of the flexible mechanism is determined according to the size of the gap. The flexible mechanism has expansion and contraction functions and is used for carrying the measurement thin film to enter the gap and measure micro topography and surface roughness of the internal surface. The thickness of the flexible mechanism after contraction is within 100 μm; and the thickness of the reproduction thin film is within 100 μm.

The measurement method comprises the following specific process:

firstly, contracting the flexible mechanism to which the measurement thin film is bonded and then inserting the flexible mechanism into the gap, wherein the size of a gap inlet is between 300 μm and 1 mm; and the surface roughness Ra of the internal surface of the gap ranges from 10 nm to 500 nm;

secondly, controlling the flexible mechanism to expand or inflate through the controller so as to effectively combine the measurement thin film with a measured surface; and extracting information about the micro topography and surface roughness of the internal surface by the measurement thin film through a copy manner; and finally, controlling the flexible mechanism to contract or deflate and withdraw from the gap inlet through the controller; measuring actual numerical values of the information about the micro topography and surface roughness of the internal surface extracted by the measurement thin film through a surface topography measuring instrument; and calibrating before measurement by the measurement thin film to ensure measurement accuracy during reproduction of the measurement thin film. The surface topography measuring instrument comprises an optical/electron microscope and a roughmeter.

In addition, the measurement system also has a protecting device for an internal bending flow channel, and also prevents the contact with the internal surface of a non-measurement point in the process of extending into the internal surface.

The present invention has the beneficial effects: the present invention can effectively solve the measurement problem of the micro topography and surface roughness of the internal surface of the gap with a narrow inlet size; and the method is simple and easy to operate, and the device is easy to carry, low in cost and high in measurement accuracy.

DESCRIPTION OF DRAWING

The sole FIGURE is a flow chart of the present invention.

DETAILED DESCRIPTION

The present invention is further described below in combination with specific embodiments.

A measurement method for micro topography and surface roughness of an internal surface of a gap is realized based on a measurement system which comprises a PC, a controller, a flexible mechanism and a measurement thin film. The measurement thin film is bonded to the flexible mechanism and has a copy function. The PC operates the flexible mechanism through the controller, and sets information such as expansion size and pressure. The controller is used for driving the flexible mechanism to expand or contract. The main operation flow comprises: calibrating before measurement; inserting the flexible measurement mechanism with the measurement thin film into the gap; expanding or inflating to effectively combine the reproduction thin film with a measured surface; and reproducing surface topography information; contracting and withdrawing. After the reproduction thin film extracts the information about the micro topography and surface roughness of the internal surface, an optical/electron microscope and a roughmeter are used for measuring actual numerical values. Specific data are as follows:

the size of the gap inlet is 300 μm. The internal size is about 10×10 mm².

The flexible mechanism is made of a small air bag.

The size of the flexible mechanism is about 5×5 mm².

The size of the measurement thin film is about 3×3 mm².

The surface roughness Ra of the gap ranges from 10 nm to 500 nm.

The thickness of the flexible mechanism after contraction is 50 μm, and the thickness of the reproduction thin film is 50 μm.

The above embodiments only express the implementation of the present invention, and shall not be interpreted as a limitation to the scope of the patent for the invention. It should be noted that, for those skilled in the art, several variations and improvements can also be made without departing from the concept of the present invention, all of which belong to the protection scope of the present invention.

The invention claimed is:

1. A measurement method for micro topography and surface roughness of internal surface of gap, wherein the measurement method is realized based on a measurement system which comprises a PC, a controller, a flexible mechanism and a measurement thin film; the measurement thin film has a copy function and is bonded to the flexible mechanism; the PC is connected with the flexible mechanism through the controller to control the flexible mechanism to expand or contract; the flexible mechanism has expansion and contraction functions and is used for carrying the measurement thin film to enter the gap and measure micro topography and surface roughness of the internal surface;

the measurement method comprises the following specific process:

firstly, contracting the flexible mechanism to which the measurement thin film is bonded and then inserting the flexible mechanism into the gap, wherein the size of a gap inlet is between 300 μm and 1 mm;

secondly, controlling the flexible mechanism to expand through the controller so as to effectively combine the measurement thin film with a measured surface; and extracting information about the micro topography and surface roughness of the internal surface by the measurement thin film through a copy manner; and finally, controlling the flexible mechanism to contract and withdraw from the gap inlet through the controller; measuring actual numerical values of the information about the micro topography and surface roughness of the internal surface extracted by the measurement thin film through a surface topography measuring instrument; and calibrating before measurement by the measurement thin film to ensure measurement accuracy during reproduction of the measurement thin film.

2. The measurement method for micro topography and surface roughness of internal surface of gap according to claim 1, wherein the flexible mechanism is made of shape memory alloy or an air bag; and the size of the flexible mechanism is determined according to the size of the gap.

3. The measurement method for micro topography and surface roughness of internal surface of gap according to claim 1, wherein the thickness of the flexible mechanism after contraction is within 100 μm; and the thickness of the measurement thin film is within 100 μm.

4. The measurement method for micro topography and surface roughness of internal surface of gap according to claim 1, wherein the surface roughness Ra of the internal surface of the gap ranges from 10 nm to 500 nm.

5. The measurement method for micro topography and surface roughness of internal surface of gap according to claim 3, wherein the surface roughness Ra of the internal surface of the gap ranges from 10 nm to 500 nm.

6. The measurement method for micro topography and surface roughness of internal surface of gap according to claim 1, wherein the surface topography measuring instrument comprises an optical/electron microscope and a roughmeter.

7. The measurement method for micro topography and surface roughness of internal surface of gap according to claim 3, wherein the surface topography measuring instrument comprises an optical/electron microscope and a roughmeter.

8. The measurement method for micro topography and surface roughness of internal surface of gap according to claim 4, wherein the surface topography measuring instrument comprises an optical/electron microscope and a roughmeter.

* * * * *